United States Patent
Carpenter, Jr.

(10) Patent No.: US 8,998,181 B2
(45) Date of Patent: Apr. 7, 2015

(54) SYSTEM AND METHOD FOR VIBRATION ISOLATION

(75) Inventor: Joseph R. Carpenter, Jr., Kennedale, TX (US)

(73) Assignee: Bell Helicopter Textron Inc., Forth Worth, TX (US)

( * ) Notice: Subject to any disclaimer, the term of this patent is extended or adjusted under 35 U.S.C. 154(b) by 89 days.

(21) Appl. No.: 13/561,871

(22) Filed: Jul. 30, 2012

(65) Prior Publication Data

US 2014/0027963 A1     Jan. 30, 2014

(51) Int. Cl.
| | | |
|---|---|---|
| *F16J 9/00* | (2006.01) | |
| *F16F 1/02* | (2006.01) | |
| *F16C 7/02* | (2006.01) | |
| *F16C 11/04* | (2006.01) | |
| *F16C 27/02* | (2006.01) | |

(52) U.S. Cl.
CPC . *F16F 1/025* (2013.01); *F16C 7/02* (2013.01); *F16C 11/04* (2013.01); *F16C 27/02* (2013.01)

(58) Field of Classification Search
CPC .............. F16J 9/063; F16J 9/06; F16J 9/066; F16J 9/14
USPC ......... 267/1.5, 161, 164; 244/104 R, 104 CS, 244/104 LS, 54; 248/562, 565, 265, 560, 248/575, 576, 603, 604, 622, 623, 626, 248/630; 277/482, 480; 417/137
See application file for complete search history.

(56) References Cited

U.S. PATENT DOCUMENTS

| | | | | | |
|---|---|---|---|---|---|
| 17,683 | A | * | 6/1857 | Lasher | 277/482 |
| 93,273 | A | * | 8/1869 | Brown | 277/482 |
| 106,495 | A | * | 8/1870 | Maydole | 277/482 |
| 495,218 | A | * | 4/1893 | Coe | 152/254 |
| 1,144,486 | A | * | 6/1915 | Lovatt | 277/482 |
| 1,474,024 | A | * | 11/1923 | Cowles | 277/456 |
| 1,942,968 | A | * | 1/1934 | Marien | 267/1.5 |
| 2,044,451 | A | * | 6/1936 | Teetor | 267/1.5 |

(Continued)

FOREIGN PATENT DOCUMENTS

| | | | |
|---|---|---|---|
| DE | 25 14 055 | 10/1976 | |
| EP | 0 068 387 | 1/1983 | .............. F16C 32/00 |

OTHER PUBLICATIONS

European Patent Office Communication dated Apr. 29, 2013, regarding Application No. 12189509.8-1755; ref. JL 65476P.EPP.

(Continued)

*Primary Examiner* — Bradley King
*Assistant Examiner* — Stephen Bowes
(74) *Attorney, Agent, or Firm* — Baker Botts L.L.P.

(57) ABSTRACT

In accordance with one embodiment of the present disclosure, an apparatus includes a connection body and a connection element arranged at least partially within the connection body. The connection body is operable to couple to a first element in a link arrangement and the connection element is operable to couple to a second element in the link arrangement. The apparatus further includes a metallic spring system arranged circumferentially around at least a portion of the connection element. The metallic spring system is operable to compress in response to relative movement between the connection body and the connection element.

18 Claims, 6 Drawing Sheets

(56) References Cited

U.S. PATENT DOCUMENTS

| | | | | |
|---|---|---|---|---|
| 2,084,828 | A | * | 6/1937 | Teetor ............................ 267/1.5 |
| 2,838,267 | A | * | 6/1958 | Wells ........................ 267/140.11 |
| 2,968,477 | A | * | 1/1961 | Wilkinson .................... 267/154 |
| 3,545,286 | A | * | 12/1970 | Stenstrom ..................... 248/604 |
| 4,317,574 | A | * | 3/1982 | Honda .......................... 277/485 |
| 5,553,834 | A | | 9/1996 | Je et al. |
| 5,709,516 | A | * | 1/1998 | Peterson et al. .............. 411/544 |
| 7,155,903 | B2 | * | 1/2007 | Ishiwa ............................. 60/322 |
| 7,290,985 | B2 | * | 11/2007 | James et al. ...................... 416/1 |
| 2005/0163407 | A1 | | 7/2005 | Kang et al. |

OTHER PUBLICATIONS

Elastomeric Rod Ends for Aircraft Interiors, LORD Corp product data.

Elastomeric Rod Ends for Aircraft Interiors, LORD—Solutions for a World in Motion, 2000.

Enidine Innovations, "Elastomeric Rod Ends Support Aircraft Equipment and Reduce Cabin Noise", vol. 1 Issue 6, Enidine Inc., www.enidine.com/www.itt.com.

Examiner's Requisition, Canadian Intellectual Property Office, Application No. 2,822,655, dated Sep. 25, 2014, 2 pages.

* cited by examiner

US 8,998,181 B2

SYSTEM AND METHOD FOR VIBRATION ISOLATION

TECHNICAL FIELD

This disclosure relates in general to link arrangements for moving elements and more particularly to a system and method for vibration isolation.

BACKGROUND

Traditionally, link arrangements in an aircraft, vehicle, or other system that may include a moving (i.e., vibrating, oscillating, etc.) component sometimes include a hard linkage arrangement to couple one element of the aircraft to another element of the aircraft. Unfortunately, such hard linkage arrangements tend to transfer vibrations of the first element to the second element. Such transfer of vibrations may be problematic. Additional link arrangement systems may include dog bone-type links and various rod ends. These prior art systems, however, have disadvantages which may be addressed in this disclosure.

SUMMARY OF THE DISCLOSURE

In accordance with one embodiment of the present disclosure, an apparatus includes a connection body and a connection element arranged at least partially within the connection body. The connection body is operable to couple to a first element in a link arrangement and the connection element is operable to couple to a second element in the link arrangement. The apparatus further includes a metallic spring system arranged circumferentially around at least a portion of the connection element. The metallic spring system is operable to compress in response to relative movement between the connection body and the connection element.

Numerous technical advantages are provided according to various embodiments of the present disclosure. Particular embodiments of the disclosure may exhibit none, some, or all of the following advantages depending on the implementation. In particular embodiments, the apparatus may be made entirely (or partially) of metal. This may allow, in particular embodiments, the apparatus to be utilized in harsh environments, such as environments with temperatures greater than 180° Fahrenheit (F.) and/or environments that include extended exposure to oil, grease, solvent, sand, and/or grit. In particular embodiments, the spring system of the apparatus may be arranged circumferentially around at least a portion of a connection element. This may allow, in particular embodiments, the apparatus to be lightweight and/or spatially compact.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DRAWINGS

Embodiments of the present disclosure and their advantages are best understood by referring to FIGS. 1 through 6 of the drawings, like numerals being used for like and corresponding parts of the various drawings.

Figure 1:
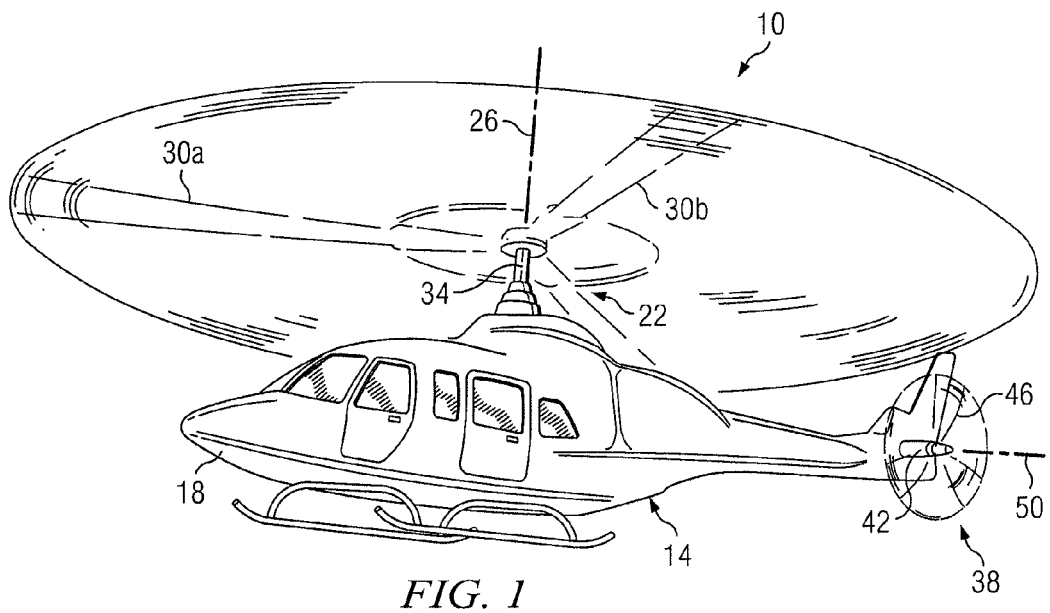
FIG. 1 illustrates one embodiment of a system that includes one or more elements that may move and/or that may be isolated from such movement.

FIG. 1 illustrates one embodiment of a system 10 that includes one or more elements that may move (i.e., by vibrating, oscillating, etc.) and/or that may be isolated from such movement. According to the illustrated embodiment, system 10 is a helicopter 14. Helicopter 14 may include a fuselage 18 and a main rotor assembly 22, including main rotor blades 30 and a main rotor shaft 34. Main rotor blades 30 generally rotate about a longitudinal axis 26 of main rotor shaft 34. Helicopter 14 may further include a tail rotor assembly 38, including tail rotor blades 46 and a tail rotor shaft 42. Tail rotor blades 46 generally rotate about a longitudinal axis 50 of tail rotor shaft 42. In particular embodiments, helicopter 14 may include one or more vibration isolation devices (not shown) that may isolate the movement of a first element of helicopter 14 from another element of helicopter 14. For example, helicopter 14 may include one or more vibration isolation devices that may isolate the fuselage 18 of helicopter 14 from movements (such as mechanical vibrations) arising from the engine, transmission, and/or rotors of helicopter 14.

Figure 2A:
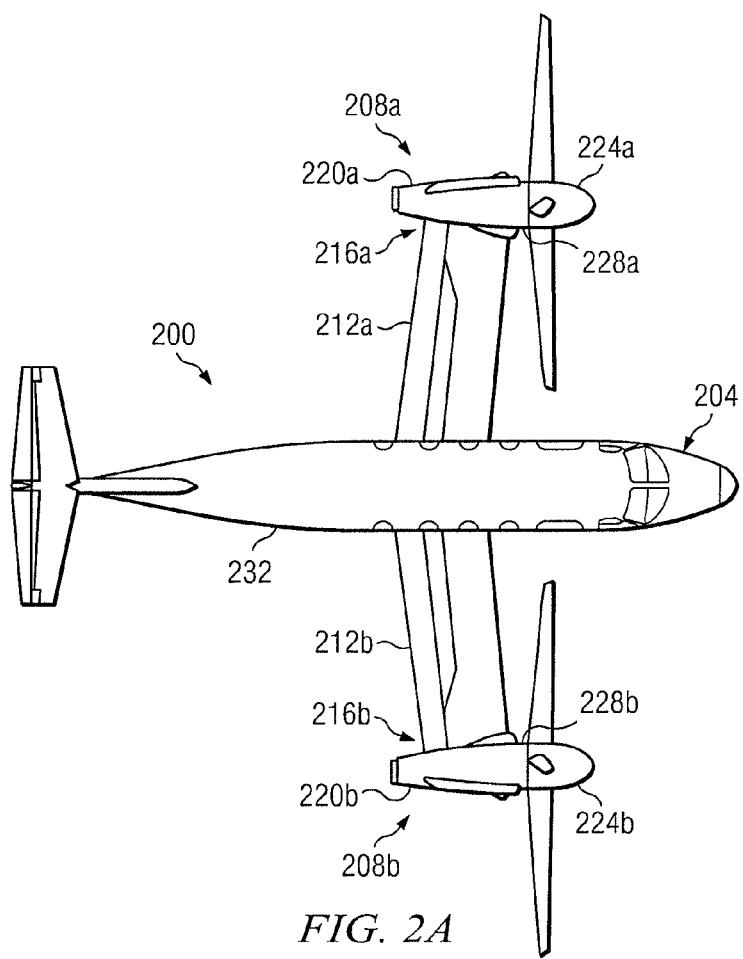
FIGS. 2A and 2B illustrate one embodiment of another system that includes one or more elements that may move and/or that may be isolated from such movement.
Figure 2B:
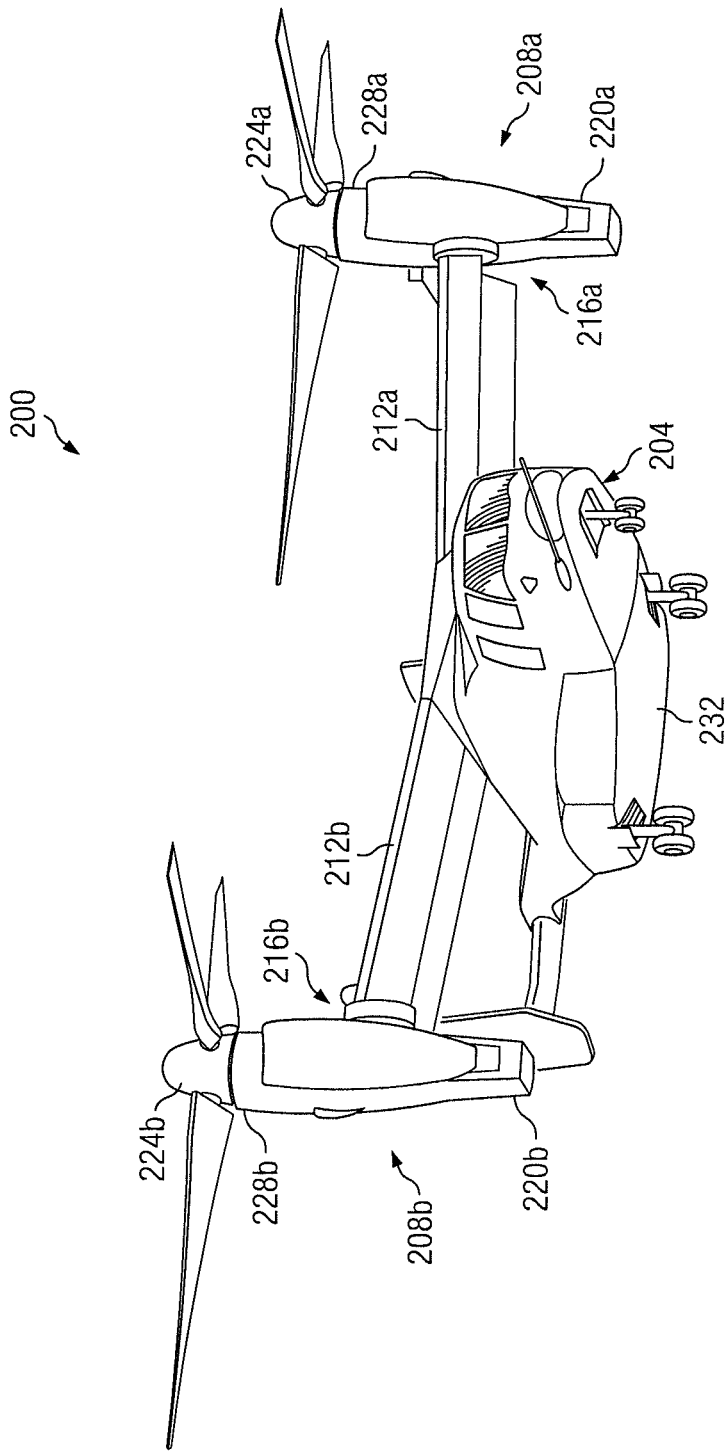

FIGS. 2A and 2B illustrate one embodiment of another system 200 that includes one or more elements that may move (i.e., by vibrating, oscillating, etc.) and/or that may be isolated from such movement. According to the illustrated embodiment, system 200 is a tilt rotor aircraft 204. Tilt rotor aircraft 204 may include rotor assemblies 208a and 208b carried by wings 212a and 212b. Rotor assemblies 208a and 208b may be disposed at end portions 216a and 216b of wings 212a and 212b, respectively. Tilt rotor assemblies 208a and 208b may include nacelles 220a and 220b, which carry the engines and transmissions of tilt rotor aircraft 204, as well as, rotor hubs 224a and 224b on forward ends 228a and 228b of tilt rotor assemblies 208a and 208b, respectively.

Tilt rotor assemblies 208a and 208b may rotate (or otherwise move) relative to wings 212a and 212b between a helicopter mode in which tilt rotor assemblies 208a and 208b are tilted upward such that tilt rotor aircraft 204 flies like a conventional helicopter (as is illustrated in FIG. 2B); and an airplane mode in which tilt rotor assemblies 208a and 208b are tilted forward, such that tilt rotor aircraft 204 flies like a conventional propeller driven aircraft (as is illustrated in FIG. 2A). Tilt rotor aircraft 204 may further include fuselage 232, coupled to wings 212a and 212b. In particular embodiments, tilt rotor aircraft 204 may include one or more vibration isolation devices (not shown) that may isolate the movement of a first element of tilt rotor aircraft 204 from another element of tilt rotor aircraft 204. For example, tilt rotor aircraft 204 may include one or more vibration isolation devices that may isolate the fuselage 232 of tilt rotor aircraft 204 from movements (such as mechanical vibrations) arising from the engine, transmission, and/or rotors of tilt rotor aircraft 204.

Although FIGS. 2A and 2B illustrate the tilt rotor aircraft 204 as including only two tilt rotor assemblies 208a and 208b. In particular embodiments, tilt rotor aircraft 204 may include any suitable number of tilt rotor assemblies 208. For example, tilt rotor aircraft 204 may include four tilt rotor assemblies 208.

Although FIGS. 1, 2A, and 2B illustrate helicopter 14 and tilt rotor aircraft 204 as particular examples of systems that include one or more elements that may move (i.e., by vibrating, oscillating, etc.) and/or that may be isolated from such movement, vibration isolation devices may be utilized an any other system that includes one or more elements that may move and/or that may be isolated from such movement. Examples of such systems that may include vibration isolation devices may include an aircraft (such as an airplane, jet-powered aircraft, rocket-powered aircraft, spacecraft, blimp, etc.), a vehicle (such as a car, truck, train, all-terrain vehicle (ATV), ship, boat, bulldozer, motorcycle, etc.) or any other system that includes one or more elements that may move (i.e., by vibrating, oscillating, etc.) and/or that may be isolated from such movement.

Figure 3:
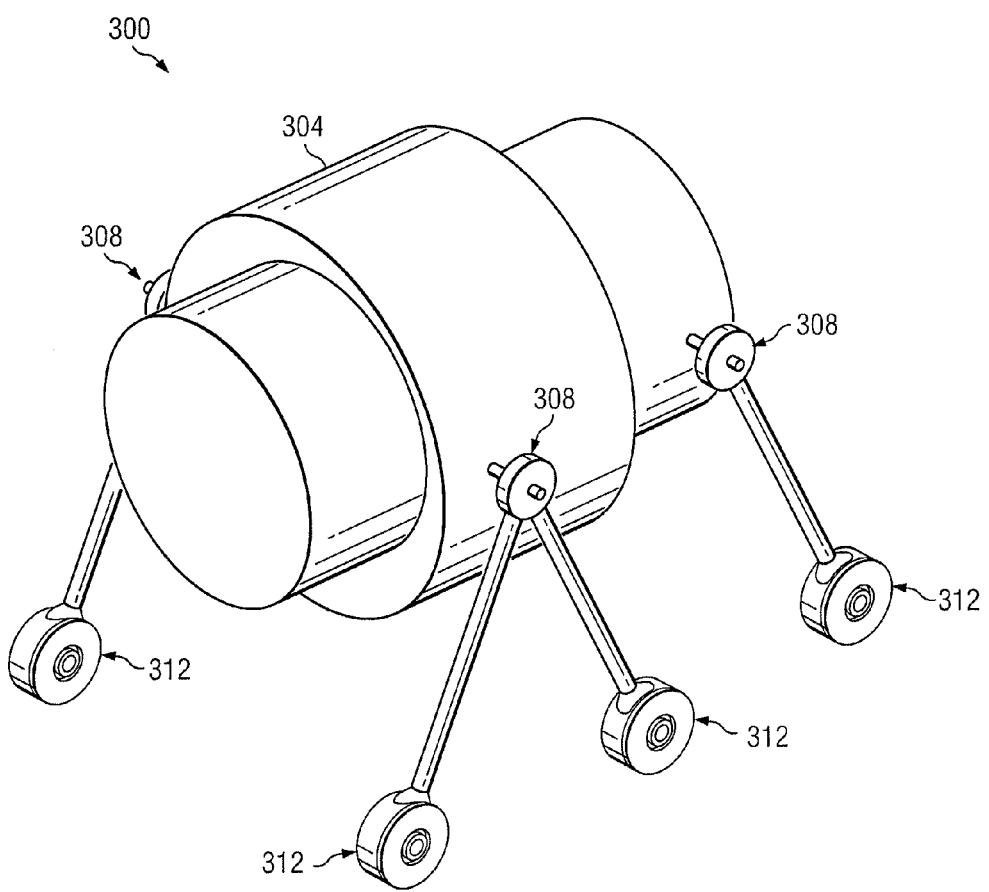
FIG. 3 illustrates one embodiment of a link arrangement configuration that may be utilized to isolate the movements of a first element from a second element.

FIG. 3 illustrates one embodiment of a link arrangement configuration 300 that may be utilized to isolate the movements of a first element from a second element. According to the illustrated embodiment, link arrangement configuration 300 includes first element 304, mounting links 308, vibration isolation devices 312, and a second element (not shown). In the illustrated embodiment, first element 304 is connected to mounting links 308, which are connected to vibration isolation devices 312. Furthermore, vibration isolation devices 312 are connected (directly or indirectly) to the second element (not shown). As such, first element 304 is indirectly connected to the second element, thereby transferring the load of first element 304 to the second element. However, the vibration isolation devices 312 may isolate the second element from the movement of first element 304. In particular embodiments, vibration isolation refers to the utilization of acceleration of a fluid body to cancel the displacement of vibration. For example, a simple force equation for vibration is set forth as follows:

$$F=m\ddot{x}+c\dot{x}+kx$$

Based on the above equation, vibration isolation utilizes acceleration of a fluid body $m\ddot{x}$ to cancel the displacement of vibration $kx$. In particular embodiments, vibration isolation is distinguishable from dampening (which sometimes may be erroneously referred to as "isolation"). For example, dampening is concerned with restricting flow of a fluid or other body, and thus velocity $c\dot{x}$ and does not cancel vibration, but merely absorbs its frequency.

In particular embodiments, by isolating the second element from the movement of first element 304, the vibration isolation devices 312 may substantially prevent the movement of first element 304 from causing movement in a second element (i.e., substantially prevent the movement of first element 304 from being transferred to the second element). In particular embodiments, substantially preventing the movement of a first element from causing movement in a second element may refer to preventing at least 80% of the movement of the first element from being transferred to the second element. In particular embodiments, by isolating the second element from the movement of first element 304, the vibration isolation devices 312 may prevent any other amount of movement of first element 304 from being transferred to the second element, such as 0%, 10%, 30%, 50%, 70%, 90%, 100%, or any other amount. In particular embodiments, by isolating the second element from the movement of first element 304, the vibration isolation devices 312 may prevent any range of movement of first element 304 from being transferred to the second element, such as 0-100%, 50-100%, 60-100%, 70-100%, 80-100%, 90-100%, or any other range.

First element 304 includes any element that may move (i.e., by vibrating, oscillating, etc.). For example, first element 304 may include a dynamic element, such as an engine, pump, generator, gearbox, rotor, any other element that may move, or any portion of each of the preceding. In particular embodiments, first element 304 may be a dynamic element of an aircraft or vehicle. For example, first element 304 may be an engine of helicopter 14 of FIG. 1. Because first element 304 may be part of an aircraft or vehicle, first element 304 may be connected to the aircraft or otherwise secured to the aircraft or vehicle (on the interior or exterior of the aircraft or vehicle) using a link arrangement. Unfortunately, it may be disadvantageous for the movement of first element 304 to cause movement in (i.e., be transferred to) the second element of the aircraft or vehicle. As such, a link arrangement (such as link arrangement assembly 300) that utilizes one or more vibration isolation device 312 may be utilized to substantially prevent the movement of first element 304 from causing movement in the second element.

Mounting link 308 includes any connector that may connect first element 304 to vibration isolation devices 312. For example, mounting link 308 may include a connection rod that connects first element 304 to vibration isolation devices 312. As another example, mounting link 308 may include a machined fitting that connects first element 304 to vibration isolation devices 312. In particular embodiments, mounting link 308 may further indirectly connect first element 304 to the second element (by connecting to vibration isolation devices 312 and subsequently to the second element). For example, mounting link 308 may connect the engine of helicopter 14 of FIG. 1 to the fuselage 18 of helicopter 14. As such, first element 304 may be connected (or otherwise secured) to the second element of an aircraft, vehicle, or any other suitable system.

Vibration isolation device 312 may include any device that may isolate the second element from one or more movements (i.e., vibrations, oscillations, etc.) of first element 304. According to the illustrated embodiment, vibration isolation device 312 may connect to one or more mounting links 308, thereby indirectly connecting to first element 304. Furthermore, vibration isolation device 312 may further connect (directly or indirectly) to the second element, thereby isolating the second element from the movements of first element 304.

In particular embodiments, one or more portions of vibration isolation device 312 may be made of metal (i.e., metallic). In particular embodiments, all of the portions of vibration isolation device 312 may be made of metal. Because vibration isolation device 312 may be made entirely (or mostly) of metal, vibration isolation device 312 may be used in harsh environments. As an example, vibration isolation device 312 may be used in an environment with high temperatures, such as temperatures greater than 180° F. In particular embodiments, vibration isolation device 312 may be used in an environment with temperatures greater than 185° F., 190° F., 195° F., 200° F., 210° F., 250° F., 300° F., 500° F., 700° F., 1,000° F., 1300° F., or any other temperature greater than 180° F. In particular embodiments, vibration isolation device 312 may be used in an environment with temperatures ranges of 180° F.-250° F., 185° F.-250° F., 190° F.-250° F., 200° F.-300° F., 180° F.-1300° F., or any other temperature range greater than 180° F. Examples of such harsh environments may include engine compartments, gearbox compartments, exhaust compartments, or any other equipment compartments. Although vibration isolation device 312 has been described as capable of being used in environment with high temperatures (such as temperatures greater than 180° F.), vibration isolation device 312 may also be used in environments with lower temperatures. For example, vibration isolation device 312 may be used at any temperature between −400° F.-1300° F. Furthermore, in particular embodiments, because vibration isolation device 312 may be made entirely (or mostly) of metal, vibration isolation device 312 may be able to withstand extended exposure to oil, grease, solvent, sand, grit, any other corrosive material, or any combination of the preceding.

Vibration isolation device 312 may be made of any suitable metal. For example, vibration isolation device 312 may be made of carbon steel, blue-tempered carbon steel, stainless steel, nickel based alloys, titanium alloys, aluminum alloys, any other metal, or any combination of the preceding. In particular embodiments, vibration isolation device 312 may be made entirely (or partially) of such metal. Furthermore, one or more portions of vibration isolation device 312 may be made of a different metal than other portions of vibration isolation device 312. Further details regarding vibration isolation device 312 are described below with regard to FIGS. 4A, 4B, 5A, and 5B.

The second element (not shown) of link arrangement configuration 300 may include any element that may be isolated from the movement of first element 304. For example, the second element may include the fuselage of an aircraft, the body of an aircraft, the wings of an aircraft, any other portion of an aircraft, the body of a vehicle, any other portion of a vehicle, or any other element of a system that includes first element 304. In particular embodiments, the second element may be the fuselage 18 of helicopter 14 of FIG. 1. In particular embodiments, the second element may be the portion of an aircraft, vehicle, or other system to which first element 304 is connected to (or otherwise secured to).

As is discussed above, vibration isolation device 312 may isolate the second element from one or more movements of first element 304. As such, the load of first element 304 may be transferred to the second element, but the movement of first element 304 may be substantially prevented from causing movement in the second element.

Although FIG. 3 is described above as including a first element 304 that moves (i.e., by vibrating, oscillating, etc.) while the second element is isolated from such movement, in particular embodiments, the second element may be the element that moves while the first element 304 may be isolated from such movement. Furthermore, although FIG. 3 is described above as including mounting links 308 that connect the first element 304 to vibration isolation devices 312, in particular embodiments, vibration isolation devices 312 may be directly connected to first element 304.

Modifications, additions, or omissions may be made to the link arrangement configuration 300 without departing from the scope of the invention. The components of the link arrangement configuration 300 may be integrated or separated. Moreover, the operations of the link arrangement configuration 300 may be performed by more, fewer, or other components. For example, the operations of the first element 304 may be performed by more than one component.

Figure 4A:
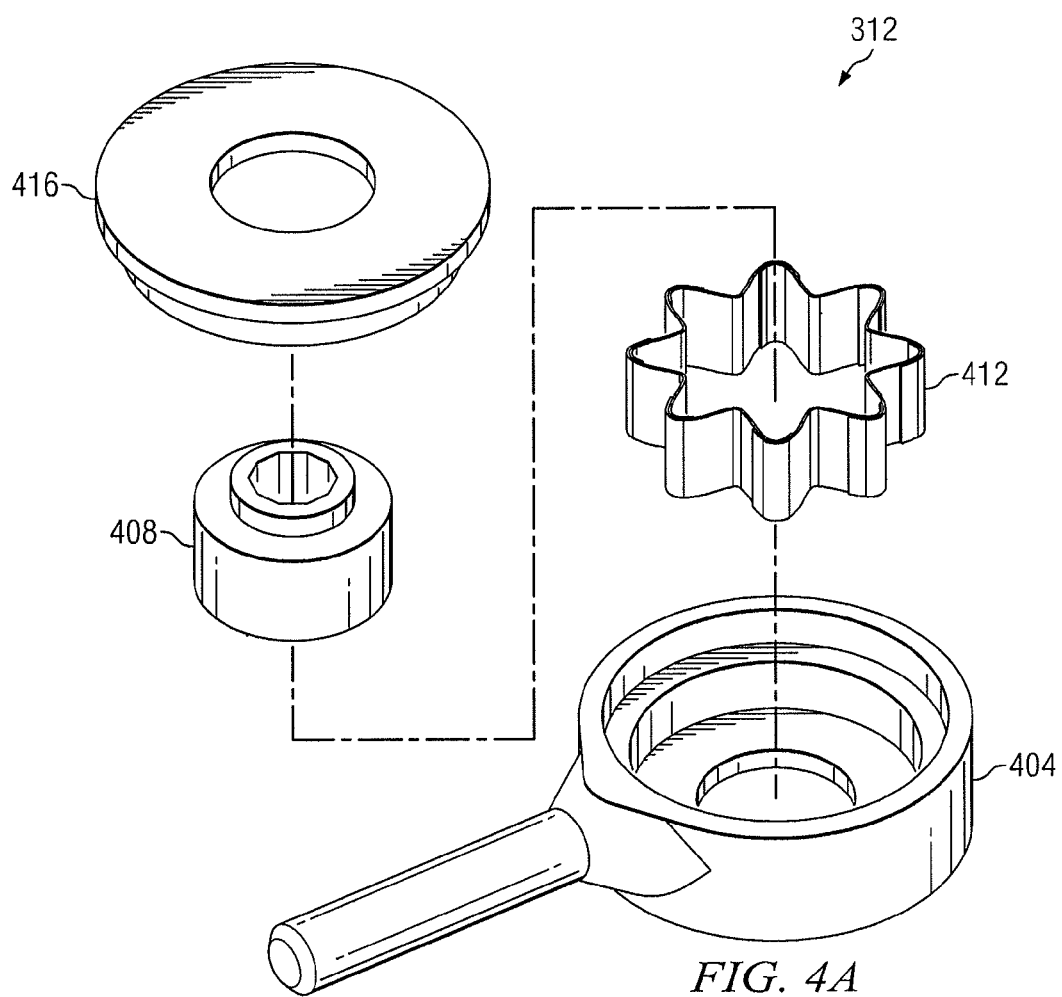
FIGS. 4A and 4B illustrate an exploded view and an isometric view of one embodiment of a vibration isolation device.
Figure 4B:
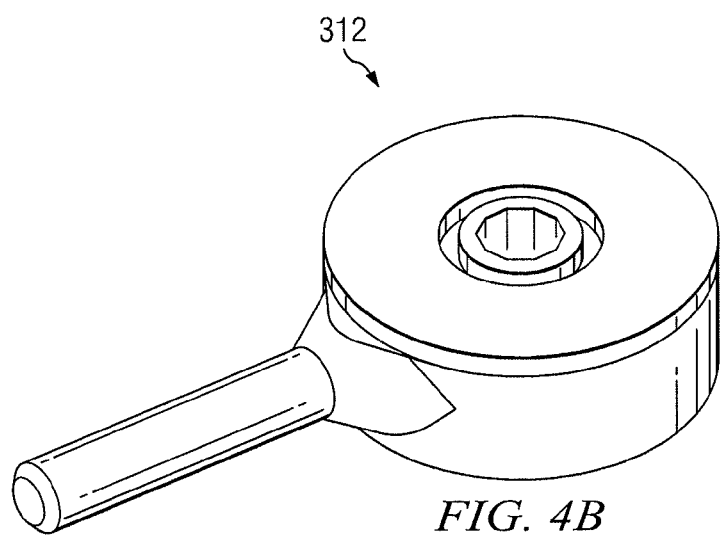

FIGS. 4A and 4B illustrate an exploded view and an isometric view of one embodiment of a vibration isolation device 312. According to the illustrated embodiment, vibration isolation device 312 includes connection body 404, connection element 408, spring system 412, and cover 416.

Connection body 404 includes any element that may connect to a first element in a link arrangement and that further contains (at least partially) connection element 408 and spring system 412. For example, connection body 404 may be a casing, a container, a shell, or any other type of containing body. As another example, connection body 404 may be any element that may connect to first element 304 in link arrangement configuration 300 of FIG. 3.

Connection body 404 may connect to a first element in any suitable manner. For example, connection body 404 may include a threaded protruding connective end. As such, in particular embodiments, connection body 404 may be connected to the first element by screwing the connection body 404 into the first element (providing a direct connection) or into a mounting link that is connected to the first element (providing an indirect connection). In particular, with regard to the embodiment illustrated in FIG. 3, connection body 404 may be screwed into mounting link 308, which is connected to first element 304. As another example, connection body 404 may include a threaded hole, allowing the first element or a mounting link to be screwed into the connection body. Furthermore, as additional examples, connection body 404 may connect to a first element (directly or indirectly) by welding, bolting, clipping, being integrated with the first element or mounting link (such as when connection body 404 is manufactured as a portion of the first element or mounting link), any other method of connection, or any combination of the preceding. Additionally, although, connection body 404 has been described above as connecting (directly or indirectly) to the first element that moves, in particular embodiments, connection body 404 may alternatively connect (directly or indirectly) to the second element that is isolated from movement.

According to the illustrated embodiment, connection body 404 may contain connection element 408 and spring system 412 at least partially within connection body 404. For example, one or more portions of connection element 408 and spring system 412 may be arranged within connection body 404. In particular embodiments, such an arrangement may allow vibration isolation device 412 to isolate the second element from one or more movements of a first element.

Connection body 404 may be made of any suitable material. For example, as is discussed above with regard to FIG. 3, connection body 404 may be made of metal, such as carbon steel, blue-tempered carbon steel, stainless steel, nickel based alloys, titanium alloys, aluminum alloys, any other metal, or any combination of the preceding. As another example, connection body 404 may be made of any suitable non-metal, such as polymers and/or or plastics.

Connection body 404 may have any suitable size or shape. For example, connection element 404 may be spatially compact, thereby allowing it to fit into small areas. As another example, connection element may be lightweight, preventing it from burdening an aircraft, vehicle, or other system.

Connection element 408 includes any element that may couple to a second element in a link arrangement. For example, connection element 408 may be a bearing, bushing, any other connection element, or any combination of the preceding. As another example, connection element 408 may be any element that may connect to the second element in link arrangement configuration 300 of FIG. 3.

Connection element 408 may connect to a second element in any suitable manner. For example, connection element 408 may include a threaded hole. As such, in particular embodiments, connection element 408 may be connected to the second element by screwing the second element into the connection element 408 (providing a direct connection) or by screwing a connector piece (which is connected to the second element) into connection element 408 (providing an indirect connection). As another example, connection element 408 may include a threaded protruding connective end, allowing connection element 408 to be screwed into the second element or connection piece. Furthermore, as additional examples, connection element 408 may connect to a second element (directly or indirectly) by welding, bolting, clipping, being integrated with the second element or the connection piece (such as when connection element 408 is manufactured as a portion of the second element or the connection piece), any other method of connection, or any combination of the preceding. Additionally, although, connection element 408 has been described above as connecting (directly or indirectly) to the second element that is isolated from the movement of the first element, in particular embodiments, connection element 408 may alternatively connect (directly or indirectly) to the first element that moves.

Connection element 408 may be made of any suitable material. For example, as is discussed above with regard to FIG. 3, connection element 408 may be made of metal, such as carbon steel, blue-tempered carbon steel, stainless steel, nickel based alloys, titanium alloys, aluminum alloys, any other metal, or any combination of the preceding. As another example, connection element 408 may be made of any suitable non-metal, such as polymers and/or or plastics.

Connection element 408 may have any suitable size or shape. For example, connection element 408 may be cylindrical. As another example, connection element 408 may be spherical. In particular embodiments, the spherical shape of connection element 408 may minimize off-axis loading by allowing connection element 408 to move in various axes to compensate for such off-axis loading.

Figure 5A:
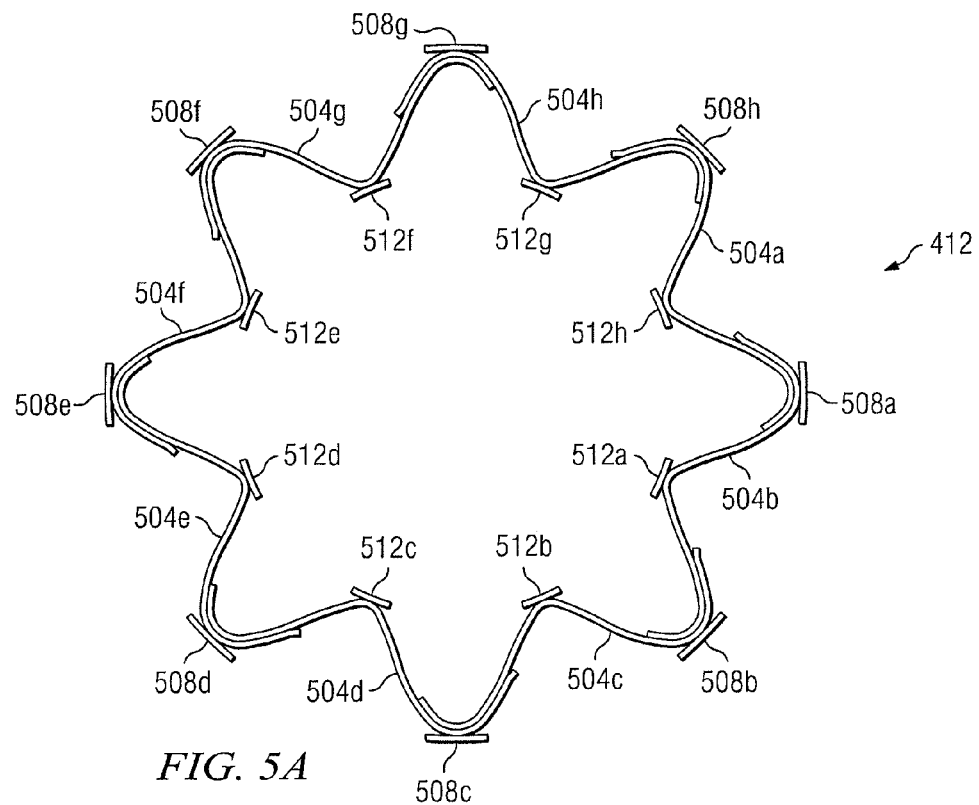
FIG. 5A illustrates one embodiment of spring system.
Figure 5B:
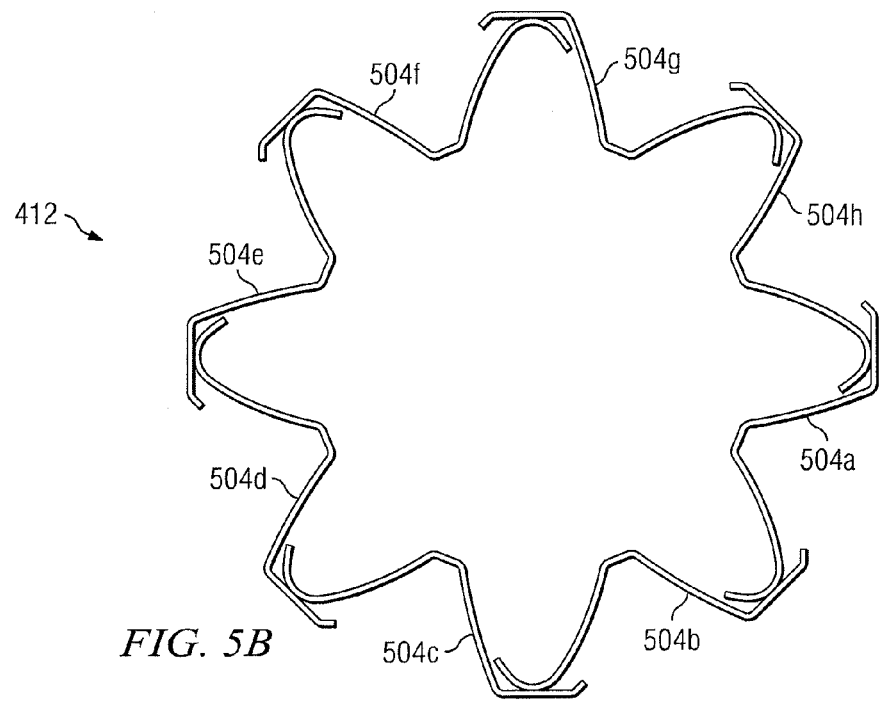
FIG. 5B illustrates another embodiment of spring system.

Spring system 412 includes one or more springs that may compress and/or expand to provide vibration isolation. For example, spring system 412 may include one spring, two springs, three springs, four springs, eight springs, or any other suitable number of springs. In particular embodiments, the springs of spring system 412 may each be curved, as is illustrated in FIGS. 4A, 5A, and 5B. In particular embodiments, the springs of spring system 412 may be nested springs, as is also illustrated in FIGS. 4A, 5A, and 5B. According to the illustrated embodiment, springs system 412 includes eight nested curved springs.

Spring system 412 may be arranged at least partially within connection body 404 and further arranged around at least a portion of connection element 408. For example, spring system 412 may be arranged circumferentially around at least a portion of connection element 408, so as to surround and/or encircle at least the portion of connection element 408. As such, in response to connection body 404 moving (or otherwise being displaced) and/or in response to connection element 408 moving (or otherwise being displaced) within connection body 404, spring system 412 may compress and/or expand with the movement.

Spring system 412 may compress and/or expand in order to isolate a second element (such as the second element of link arrangement configuration 300 of FIG. 3) from one or more movements of a first element (such as first element 304 of link arrangement configuration 300 of FIG. 3). In particular embodiments, such compression and/or expansion of spring element 412 may substantially prevent the movement of the first element from causing movement in the second element, thereby isolating the second element from the movement of the first element.

In particular embodiments, spring system 412 may compress and/or expand at any given rate, thereby transmitting the load of the first element to the second element but not the movement to the second element. As such, when the first element moves in relation to the second element (such as when the first element vibrates, oscillates, etc.), that movement may be substantially prevented from causing movement in the second element.

In particular embodiments, any suitable modification may be made to spring system 412 in order to isolate the vibration of the first element. For example, the number, geometry, size, thickness, stiffness (or any combination of the preceding) of one or more springs in spring system 412 may be altered to compensate for different loads and frequencies. In particular embodiments, spring system 412 may be tuned to specific frequencies. For example, the stiffness of spring system 412 may be altered to match a specific frequency of the movement of the first element, thereby allowing spring system 412 to isolate that frequency. Furthermore, in particular embodiments, spring system 412 may be pre-loaded within connection body 404, thereby preventing gaps.

Spring system 412 may be made of any suitable material. For example, as is discussed above with regard to FIG. 3, spring system 412 may be made of metal (i.e., metallic), such as carbon steel, blue-tempered carbon steel, stainless steel, nickel based alloys, titanium alloys, aluminum alloys, any other metal, or any combination of the preceding. As another example, spring system 412 may be made of any suitable non-metal, such as polymers and/or or plastics.

As is discussed above, spring system 412 may be arranged at least partially within connection body 404 and further arranged around at least a portion of connection element 408. As such, vibration isolation device 312 may be more lightweight and/or spatially compact. Furthermore, as a result, spring system 412 may be in contact with both connection body 404 and connection element 408. In particular embodiments, this may cause spring system 412 to bear contact between the connection body 404 and connection element 408. Such contact may cause wear, fretting, and contact stress in vibration isolation device 312. In particular embodiments, such wear, fretting, and contact stress may be reduced in any suitable manner. For example, lubrication may be added to vibration isolation device 312. In particular, one or more o-rings may be added to connection body 404, and vibration isolation device 312 may be filled with grease. Such grease may be sealed within vibration isolation device 312 so as to prevent leakage and provide sustaining lubrication. In other embodiments, one or more other fluids may be added to vibration isolation device 312 to reduce wear, fretting, and contact stress, and further to create a dampening effect. Additionally, in particular embodiments, one or more Teflon liners may be added to vibration isolation device 312, one or more coatings may be added to vibration isolation device 312, and one or more different material finishes (such as polished/plated contact surfaces) may be added to vibration isolation device 312 in order to reduce wear, fretting, and contact stress. Additional examples of arrangements that may reduce wear, fretting, and contact stress are discussed below with regard to FIGS. 5A and 5B.

Cover 416 includes any suitable covering element that may enclose (at least partially) connection element 408 and spring system 412 within connection body 404. For example, cover 416 may be a cover, lid, top, cap, or any other covering element. In particular embodiments, after connection element 408 and spring system 412 are arranged at least partially within connection body 404, cover 416 may be arranged on top of connection body 404 in order to contain connection element 408 and spring system 412 within connection body. In particular embodiments, one or more portions of connection element 408 and/or spring system 412 may be accessible through cover 416. As such, this may allow connection element 408 to connect (directly or indirectly) to the second element.

Cover 416 may be arranged on top of connection body 404 in any suitable manner. For example, cover 416 may be screwed into interior threads of connection body 404. Furthermore, as additional examples, cover 416 may be arranged on top of connection body 404 by welding, bolting, clipping, snapping, any other method of connection, or any combination of the preceding.

Cover 416 may be made of any suitable material. For example, as is discussed above with regard to FIG. 3, cover 416 may be made of metal (i.e., metallic), such as carbon steel, blue-tempered carbon steel, stainless steel, nickel based alloys, titanium alloys, aluminum alloys, any other metal, or any combination of the preceding. As another example, cover 416 may be made of any suitable non-metal, such as polymers and/or or plastics.

Modifications, additions, or omissions may be made to the vibration isolation device 312 without departing from the scope of the invention. The components of the vibration isolation device 312 may be integrated or separated. Moreover, the operations of the vibration isolation device 312 may be performed by more, fewer, or other components. For example, the operations of the spring system 416 may be performed by more than one component.

FIG. 5A illustrates one embodiment of spring system 412. According to the illustrated embodiment, spring system 412 includes springs 504, connectors 508, and connectors 512.

As is discussed above with regard to FIG. 4A, spring system 412 may include any suitable number of springs 504. According to the illustrated embodiment, spring system 412 includes eight springs 504. Furthermore, each of the springs 504 of the illustrated embodiment, may be nested curved springs, as is illustrated.

Connectors 508 may include any suitable connector that connects spring system 412 to connection body 404 of FIG. 4A. In particular embodiments, connectors 508 may increase the contact area of spring system 412 with connection body 404. In particular embodiments, this may reduce contact stress between spring system 412 and connection body 404. Connectors 508 may have any suitable size and/or shape that allows for reducing contact stress. Furthermore, spring system 412 may have any suitable number of connectors 508. In particular embodiments, connectors 508 may be connected to springs 504 in any suitable manner. For example, connectors 508 may be connected to springs 504 by welding, brazing, bolting, clipping, being integrated with spring 504 (such as when connector 508 is manufactured as a portion of spring 504 and/or spring system 412), any other method of connection, or any combination of the preceding.

Connectors 512 may include any suitable connector that connects spring system 412 to connection element 408 of FIG. 4A. In particular embodiments, connectors 512 may increase the contact area of spring system 412 with connection element 408. In particular embodiments, this may reduce contact stress between spring system 412 and connection element 408. Connectors 512 may have any suitable size and/or shape that allows for reducing contact stress. Furthermore, spring system 412 may have any suitable number of connectors 512. In particular embodiments, connectors 512 may be connected to springs 504 in any suitable manner. For example, connectors 512 may be connected to springs 504 by welding, brazing, bolting, clipping, being integrated with spring 504 (such as when connector 512 is manufactured as a portion of spring 504 and/or spring system 412), any other method of connection, or any combination of the preceding.

FIG. 5B illustrates another embodiment of spring system 412. According to the illustrated embodiment, spring system 412 includes springs 504. As is discussed above with regard to FIG. 4A, spring system 412 may include any suitable number of springs 504. For example, in the illustrated embodiment, spring system 412 includes eight springs 504. Furthermore, each of the springs 504 of the illustrated embodiment, may be nested curved springs, as is illustrated.

In particular embodiment, the curvature of each of springs 504 may be modified to create a larger contact area between spring system 412 and connection body 404 and/or connection element 408. In particular embodiments, such modification may increase the flexibility of spring system 412 and may further reduce contact stress.

Modifications, additions, or omissions may be made to the spring system 416 without departing from the scope of the invention. The components of spring system 416 may be integrated or separated. Moreover, the operations of the spring system 416 may be performed by more, fewer, or other components. For example, the operations of the spring system 416 may be performed by a single spring, such as a single curved spring arranged around the connection element 408.

Figure 6:
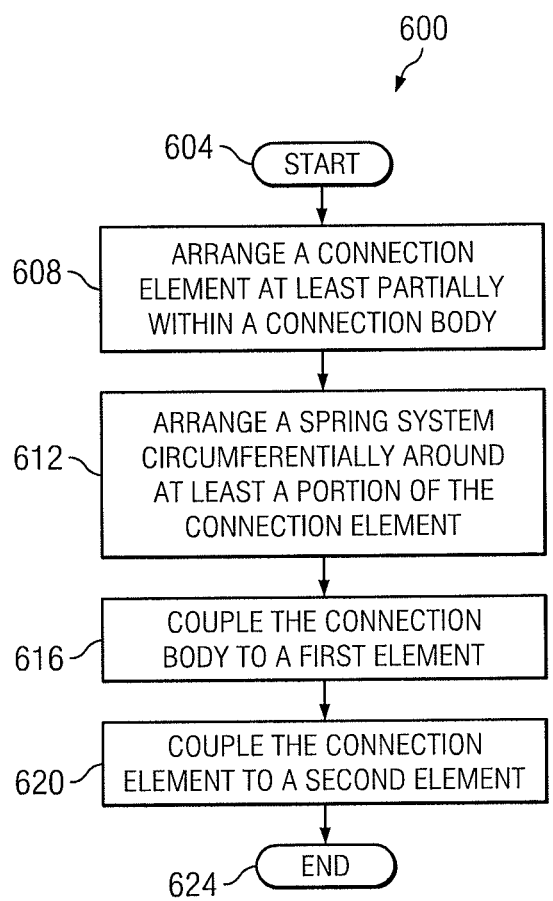
FIG. 6 illustrates one embodiment of a method for building and/or using a vibration isolation device.

FIG. 6 illustrates one embodiment of a method for building and/or using a vibration isolation device 312. In particular embodiments, one or more steps of method 600 may be performed using one or more components of FIGS. 1-5B and all of the options discussed above. Examples of the vibration isolation device 312 are described above in FIGS. 1-5B.

The method begins at step 604. At step 608, a connection element is arranged at least partially within a connection body. The connection body may include any element that couples to a first element in a link arrangement. Furthermore, the connection element may include any element that connects to a second element in a link arrangement. For example, the connection body may couple (either directly or indirectly) to an engine of an aircraft while the connection element may couple (either directly or indirectly) to a fuselage of the aircraft. Examples of each of the connection body, the connection element, the first element, and the second element are described above in FIGS. 1-5B.

At step 612, a spring system is arranged circumferentially around at least a portion of the connection element. In particular embodiments, the spring system may include any spring system that may compress and/or expand in response to a relative movement between the connection body and the connection element (i.e., movement of the connection body and/or connection element). For example, as movement of an engine is transferred to the connection body, the spring system may compress and/or expand in order to substantially prevent the movement of the engine from causing movement in (i.e., being transferred to) the fuselage of the aircraft. As another example, as movement of an engine is transferred to the connection element, the spring system may compress and/or expand in order to substantially prevent the movement of the engine from causing movement in the fuselage of the aircraft. Therefore, the vibration isolation device may isolate the second element from the movement of the first element (or may isolate the first element from the movement of the second element). Examples of the spring system are described above in FIGS. 1-5B.

At step 616, the connection body is coupled to a first element. The connection body may be coupled to the first element in any suitable manner. For example, the connection element may be coupled (directly or indirectly) to the first element. Examples of such a coupling are described above in FIGS. 1-5B.

At step 620, the connection element is coupled to a second element. The connection element may be coupled (directly or indirectly) to the second element in any suitable manner. Examples of such a coupling are described above in FIGS. 1-5B. At step 624, the method ends.

Modifications, additions, or omissions may be made to method 600. For example, one or more steps in method 600 of FIG. 6 may be performed in parallel or in any suitable order. Furthermore, any other components may be utilized to perform one or more steps in method 600 of FIG. 6.

Although FIGS. 1-6 have been described above as including particular components and/or steps, the systems and methods of FIGS. 1-6 may include any combination of any of the described components and any of the options, features, or steps described herein, as would be understood by one of ordinary skill in the art based upon the teachings of the disclosure. For example, any of the options, features, or steps described herein may be utilized in combination with the illustrated embodiments of FIGS. 1-6 and/or any number of the other options, features, or step also described herein, as would be understood by one of ordinary skill in the art based upon the teachings of the disclosure.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An apparatus, comprising:
a metallic connection body operable to couple to a first element in a link arrangement;
a metallic connection element arranged at least partially within the metallic connection body, the metallic connection element operable to couple to a second element in the link arrangement, wherein the first element is operable to move in relation to the second element; and
a metallic spring system having a perimeter that surrounds a perimeter of the metallic connection element, the metallic spring system comprising a plurality of metallic nested curved springs, each of the plurality of metallic nested curved springs having:
a length that comprises at least a portion of the perimeter of the metallic spring system;
a first portion positioned along a center of the length, the first portion extending along the perimeter of the metallic connection element and in contact with a portion of the perimeter of the metallic connection element;
a second portion along the length, the second portion extending away from the first portion towards the metallic connection body and in contact with both the metallic connection body and a portion of a second metallic nested curved spring of the plurality of metallic nested curved springs, the second portion surrounding the portion of the second metallic spring in a same plane; and
a third portion along the length, the third portion extending away from the first portion towards the metallic connection body and in contact with a third metallic nested curved spring of the plurality of metallic nested curved springs, a portion of the third portion surrounded by the third metallic spring in the same plane;
wherein the first portion is between the second portion and the third portion of the length;
wherein the metallic spring system is operable to compress in response to relative movement between the metallic connection body and the metallic connection element caused by the movement of the first element, and wherein the metallic spring system is further operable to substantially prevent the movement of the first element from causing movement in the second element.

2. An apparatus, comprising:
a connection body operable to couple to a first element in a link arrangement;
a connection element arranged at least partially within the connection body, the connection element operable to couple to a second element in the link arrangement;
a metallic spring system having a perimeter that surrounds a perimeter of the connection element, the metallic spring system comprising a plurality of metallic springs, each of the plurality of metallic springs having:
a length that comprises at least a portion of the perimeter of the metallic spring system;
a first portion positioned along a center of the length, the first portion extending along the perimeter of the connection element and in contact with a portion of the perimeter of the connection element;
a second portion along the length, the second portion extending away from the first portion towards the connection body and in contact with both the connection body and a portion of a second metallic spring of the plurality of metallic springs, the second portion surrounding the portion of the second metallic spring in a same plane; and
a third portion along the length, the third portion extending away from the first portion towards the connection body and in contact with a third metallic spring of the plurality of metallic springs, a portion of the third portion surrounded by the third metallic spring in the same plane;
wherein the first portion is between the second portion and the third portion of the length; and
wherein the metallic spring system is operable to compress in response to relative movement between the connection body and the connection element.

3. The apparatus of claim 2, wherein the connection element and the connection body are metallic.

4. The apparatus of claim 2, wherein the metallic spring system comprises a plurality of nested springs.

5. The apparatus of claim 4, wherein each of the plurality of nested springs is curved.

6. The apparatus of claim 2, wherein the first element in the link arrangement comprises an element operable to move in relation to the second element in the link arrangement.

7. The apparatus of claim 6, wherein the metallic spring system is tuned to the frequency of the movement of the first element.

8. The apparatus of claim 6, wherein the first element is selected from a group consisting of:
at least a portion of an engine;
at least a portion of a pump; and
at least a portion of a generator.

9. The apparatus of claim 6, wherein the movement of the first element causes the relative movement between the connection body and the connection element.

10. The apparatus of claim 6, wherein the metallic spring system is further operable to substantially prevent the movement of the first element from causing movement in the second element.

11. A method, comprising:
arranging a connection element at least partially within a connection body, the connection body operable to couple to a first element in a link arrangement, the connection element operable to couple to a second element in the link arrangement; and
arranging a metallic spring system circumferentially around at least a portion of the connection element so that a perimeter of the metallic spring system surrounds a perimeter of the connection element, the metallic spring system comprising a plurality of metallic springs, each of the plurality of metallic springs having:
a length that comprises at least a portion of the perimeter of the metallic spring system;
a first portion positioned along a center of the length, the first portion extending along the perimeter of the connection element and in contact with a portion of the perimeter of the connection element;
a second portion along the length, the second portion extending away from the first portion towards the connection body and in contact with both the connection body and a portion of a second metallic spring of the plurality of metallic springs, the second portion surrounding the portion of the second metallic spring in a same plane; and
a third portion along the length, the third portion extending away from the first portion towards the connection body and in contact with a third metallic spring of the plurality of metallic springs, a portion of the third portion surrounded by the third metallic spring in the same plane;
wherein the first portion is between the second portion and the third portion of the length;
wherein the metallic spring system is operable to compress in response to relative movement between the connection body and the connection element.

12. The method of claim 11, wherein the connection element and the connection body are metallic.

13. The method of claim 11, wherein the metallic spring system comprises a plurality of nested springs.

14. The method of claim 13, wherein each of the plurality of nested springs is curved.

15. The method of claim 11, wherein the first element in the link arrangement comprises an element operable to move in relation to the second element in the link arrangement.

16. The method of claim 15, wherein the metallic spring system is tuned to the frequency of the movement of the first element.

17. The method of claim 15, wherein the first element is selected from a group consisting of:
at least a portion of an engine;
at least a portion of a pump; and
at least a portion of a generator.

18. The method of claim 15, wherein the metallic spring system is further operable to substantially prevent the movement of the first element from causing movement in the second element.

* * * * *